US006456990B1

(12) United States Patent
Hoffmann et al.

(10) Patent No.: US 6,456,990 B1
(45) Date of Patent: Sep. 24, 2002

(54) METHOD FOR TRANSFORMING A FUZZY LOGIC USED TO SIMULATE A TECHNICAL PROCESS INTO A NEURAL NETWORK

(75) Inventors: Wolfgang Hoffmann; Erik Schwulera, both of Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/355,710

(22) PCT Filed: Jan. 29, 1998

(86) PCT No.: PCT/DE98/00259

§ 371 (c)(1),
(2), (4) Date: Nov. 22, 1999

(87) PCT Pub. No.: WO98/34175

PCT Pub. Date: Aug. 6, 1998

(30) Foreign Application Priority Data

Feb. 3, 1997 (DE) .......................... 197 03 965

(51) Int. Cl.[7] .......................... G06F 15/18; G06F 17/00
(52) U.S. Cl. .............................. 706/2; 706/47
(58) Field of Search ........................ 706/2, 47

(56) References Cited

U.S. PATENT DOCUMENTS 5,416,888 A   5/1995  Shimokawa ............... 706/16

FOREIGN PATENT DOCUMENTS

DE   195 28 984   9/1996
WO   WO 94/22074  9/1994

OTHER PUBLICATIONS

Ouyang et al, "Knowledge Acquisition from Input–Output–Data by Fuzzy–Neural Systems", IEEE International Conference on System, Man and Cybernetics, Oct. 1998.*

Duch et al, "Neural Optimization of Linguistic Variables and Membership functions" IEEE International Conference on Neural Information Processing, Nov. 1999.*

Chao et al., "Implementation of a fuzzy inference system using a normalized fuzzy neural network", Fuzzy Sets and Systems, 75(1995) Oct. 13, No. 1.

Jin et al., "Neural Network Based Fuzzy Identification and Its Application to Modeling and Control of Complex Systems", IEEE Transactions on Systems, Man and Cybernetics 25(1995) Jun., No. 6.

Jang et al., "Neuro–Fuzzy Modeling and Control", Proceedings of the IEEE, vol. 83, No. 3, Mar. 1995.

* cited by examiner

Primary Examiner—George B. Davis
(74) Attorney, Agent, or Firm—Staas & Halsey LLP

(57) ABSTRACT

A method for transforming a fuzzy logic system into a neural network, where, in order to simulate membership functions, sigmoid functions are linked together in such a way that, even after the optimization of the neural network, back-transformation of the neural network into a, fuzzy logic system is possible. The advantage of the method described is that a fuzzy logic system can be transformed, in particular component by component, into a neural network and the latter can then be optimized as a whole, i.e. all the components together. The possibility of back-transforming the trained neural network ultimately means that an optimized fuzzy logic system can be obtained. This advantageously makes it possible to use, in particular, standardized fuzzy system software for describing the optimized fuzzy logic system.

7 Claims, 3 Drawing Sheets

METHOD FOR TRANSFORMING A FUZZY LOGIC USED TO SIMULATE A TECHNICAL PROCESS INTO A NEURAL NETWORK

BACKGROUND OF THE INVENTION

In neuro-fuzzy systems, the input/output behavior of fuzzy systems can be optimized by using neural networks. This allows the disadvantages of fuzzy systems and of neural networks to be compensated for.

One possible method of optimizing a fuzzy system by means of a neural network is to transform a fuzzy system into a neural network and to train the latter using input/output measured values. While in the fuzzy system the system behavior of a technical process to be simulated can be introduced, the transformation into a neural network permits additional optimization with the aid of input/output measured values of the technical process to be simulated. The optimization can in this case be automated by optimization algorithms, which can be executed by the neuro-fuzzy system with the aid of a computer.

Various methods for transforming the components of a fuzzy system into the structures of a neural network are known. In particular, a fuzzy system has a fuzzy logic system which, as a rule, comprises the three components "fuzzification", "control array" and "defuzzification". The three components can be depicted in each case by using specific types of neuron. The basic structure of a neuro-fuzzy system, that is to say the individual components of the fuzzy logic system within a neuro-fuzzy network, are illustrated in FIG. 1. During the transformation of the fuzzy logic system FS into the neural network NN, the components fuzzification F, rule base R and defuzzification D are simulated in the neural network NN as a neural fuzzification network NF, a neural rule base network NR and a neural defuzzification network ND.

As a rule, trapezoidal or triangular membership functions are used for the purpose of fuzzification. Their depiction in the neural network is generally carried out using sigmoid or Gaussian functions.

FIG. 2 illustrates, by way of example, a trapezoidal membership function Z having the parameters X0, X1, X2 and X3. This membership function Z has a nonlinear profile and is normalized to a normalized value range [0,1] of the fuzzy logic system FS, said range as a rule having a maximum value MW of magnitude 1.

FIG. 3 shows, by way of example, a transformation, bearing the reference symbol NZ of the membership function Z illustrated in FIG. 2 in the neural network NN. The simulation of nonlinear transfer functions in the fuzzy logic system FS, such as the trapezoidal membership function Z, for example, is preferably carried out in the neural network NN by means of sigmoid functions.

German Patent DE 195 28 984 describes a method of transforming a fuzzy logic system into a neural network, sigmoid functions being linked together multiplicatively in order to simulate membership functions. Multiplicative linking of sigmoid functions in this way is illustrated in FIG. 4. In this case, the sigmoid functions f and g have the parameters $\mu 1$, 1 and $\mu 2$, 2.

FIG. 5 illustrates, by way of example, a result function y1 of the simulation in the neural network NN of a nonlinear, trapezoidal membership function Z of the fuzzy logic system FS. The transformation into the neural network NN is associated with the action of presetting the parameters $\mu 1$, 1, $\mu 2$, 2 of the sigmoid functions f and g. As a result of optimizing the neural network NN, in particular using input/output measured values, the parameters $\mu 1$, 1, $\mu 2$, 2 of the sigmoid functions f and g, and hence their profile, are changed.

In the abovementioned method, the case may occur in which the parameters $\mu 1$, 1, $\mu 2$, 2 change in such a way that back-transformation of the neural network NN into a fuzzy logic system FS is not readily possible. This is illustrated by way of example in FIG. 6, in which the profile of a result function y1' reached by means of optimizing the neural network NN is illustrated.

Since the value range of the membership function y1' no longer corresponds to that of the sigmoid functions f and g, back-transformation into the fuzzy logic system FS is no longer possible. The consequence of this is that a neuro-fuzzy system of this type is constructed as a neural network following optimization and has neural structures, but can no longer be operated as a pure fuzzy system. As a result, practical implementation, for example by means of standardized, commercially available fuzzy system software, is no longer possible.

The reference Proceedings of the IEEE, Vol. 83, No. 3, March 1995, pages 378 to 406, "Neuro-Fuzzy Modeling and Control" describes, in order to simulate membership functions from two sigmoid functions, taking the product or the absolute magnitude of their difference. Even in the case of simulation by forming the difference and magnitude, it is possible for the case described above to occur in which, following the training of the neural network, the value range of the membership function no longer corresponds to that of the sigmoid functions. Back-transformation of the trained neural network into a pure fuzzy system is then no longer possible. In addition, the formation of the magnitude is no longer possible with standard neurons, such as summing or product neurons. Since magnitude neurons cannot readily be differentiated, the training of the neuron network requires additional case decisions, as a result of which practical implementation, for example by means of standardized, commercially available fuzzy system software, is no longer possible.

SUMMARY

An object of the present invention is to specify a method of transforming a fuzzy logic system into a neural network where, in order to simulate membership functions, sigmoid functions are linked together in such a way that, even after the optimization of the neural network, back-transformation of the neural network into a fuzzy logic system is possible.

An advantage of the method according to the present invention is that a fuzzy logic system can be transformed, in particular component by component, into a neural network and the latter can then be optimized as a whole, i.e. all the components together.

Thus, in addition to the system behavior which can be taken into account in the fuzzy logic system, such as, for example, the number of membership functions to be used, measurement data from the technical process to be simulated can be introduced into the optimization method of the neural network. The method according to the present invention for transforming the triangular or trapezoidal membership functions in particular permits their parameters in the neural network to be varied during the optimization of the latter only in such a way that in every case subsequent back-transformation of the neural network into an optimized fuzzy logic system can take place.

An advantage of a neuro-fuzzy system according to the present invention for transforming the fuzzy logic system into a neural network is thus ultimately to obtain an appropriately optimized fuzzy logic system, as a result of the possibility of back-transforming the trained neural network. This advantageously makes it possible to use, in particular, standardized fuzzy system software for describing the optimized fuzzy logic system.

BRIEF DESCRIPTION OF THE DRAWINGS

FIGS. 8 and 9 illustrate result functions y2 and y2' which can occur during a transformation of a fuzzy logic system FS into a neural network NN of FIG. 1 by means of the method according to the present invention. In this case, the result functions y2 and y2' represent the result of simulating the membership function Z, illustrated in FIG. 2, of the fuzzy system FS by means of two sigmoid functions f and g in the neural network NN. In order that back-transformation into the fuzzy logic system FS is possible following the optimization of the neural network NN, the result functions y2 and y2' illustrated in FIGS. 8 and 9 each have the following features:

1. the value range of the result functions y2 and y2' is referred to a normalized value range [0,1] having a maximum value MW,
2. the result functions y2 and y2' each reach the maximum value MW, which as a rule has the magnitude 1, in every case, i.e. irrespective of the profile and position of the sigmoid functions f and g, and
3. the function value of the result functions y2 and y2' assumes either the value 0 or the maximum value MW, i.e. as a rule the magnitude is 1, when the absolute magnitude of the abscissa x tends to infinity.

The method according to the present invention is used for transforming fuzzy logic system FS used for simulating a technical process into a neural network NN. In the latter, in order to simulate triangular or trapezoidal membership functions Z in particular, sigmoid functions f and g are linked together. The linking is carried out in such a way that at least one difference is formed from the sigmoid functions f and g. From this difference, a positive linking result is formed which is normalized to a value range [0,1] of the fuzzy logic system FS, said value range having a maximum value MW.

The neural network NN may have as a component a neural fuzzification network NF, which is used for linking the sigmoid functions f and g together. According to the method of the present invention for transforming a fuzzy logic system FS into a neural network NN, the sigmoid functions f and g are linked together in such a way that at least a first difference is formed from the latter, and a second difference is formed from the maximum value MW and the square P2 of the first difference. For the case in which the maximum value MW has the preferred magnitude 1, the result function y2 or y2' is thus formed as $1-[f(x,\mu 3,3)-g(x,\mu 4,4)]2$.

Figure 1:
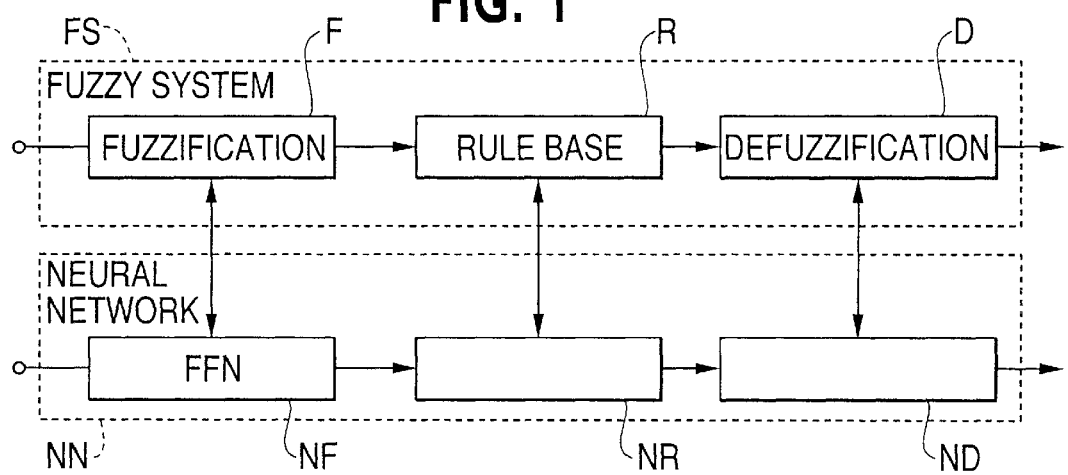
FIG. 1 shows, by way of example, the individual components of a fuzzy logic system and the associated neural network of a neuro-fuzzy system.
Figure 2:
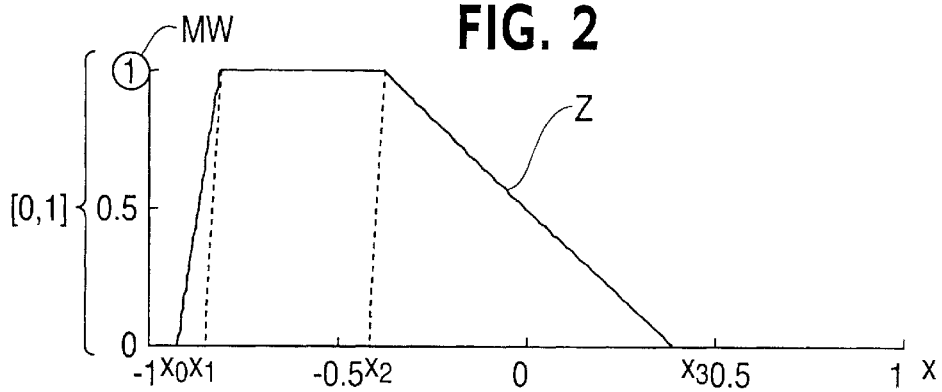
FIG. 2 shows, by way of example, a trapezoidal membership function in a fuzzy logic system.
Figure 3:
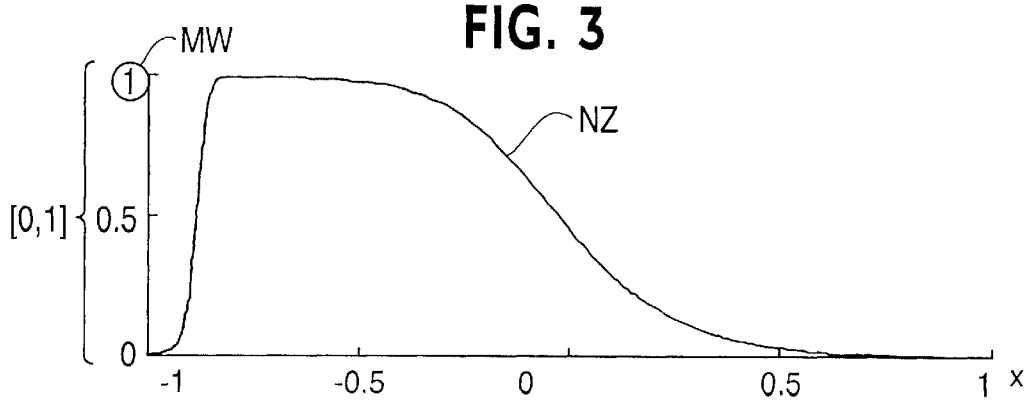
FIG. 3 shows, by way of example, the simulation of the membership function listed in FIG. 2 in the neural network by means of sigmoid functions.
Figure 4:
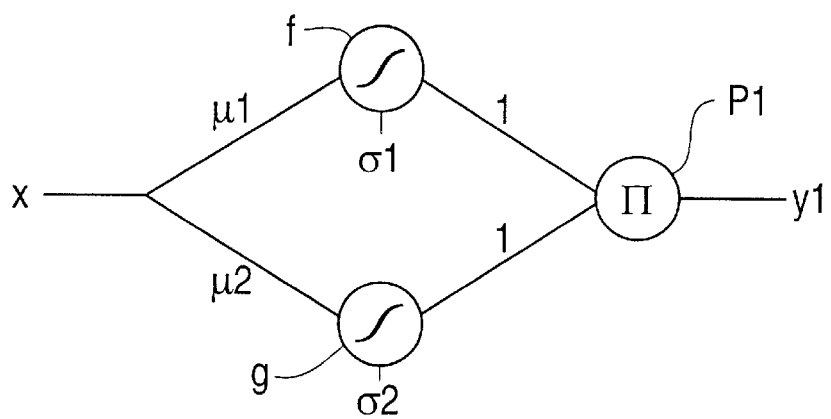
FIG. 4 shows, by way of example, a known method for the multiplicative linking of sigmoid functions.
Figure 5:
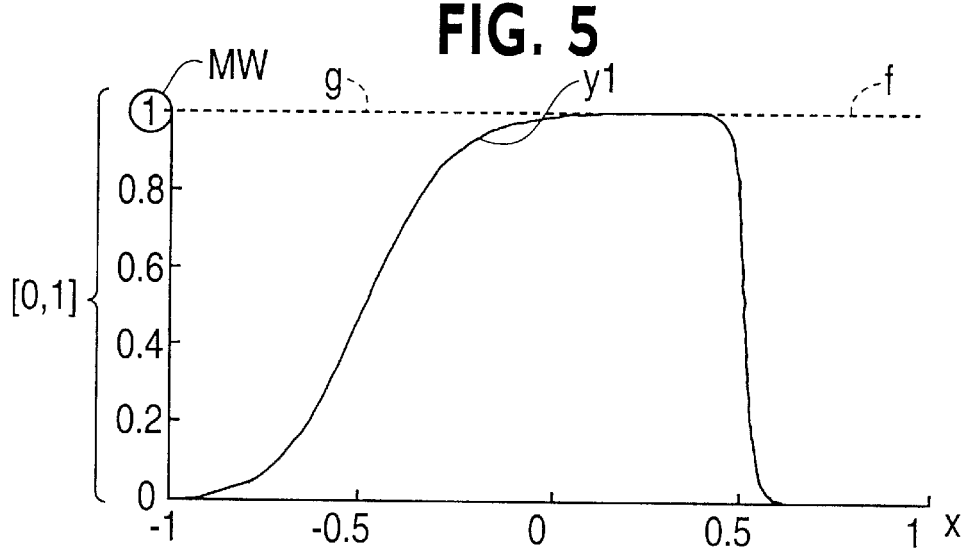
FIG. 5 shows, by way of example, the simulation of a membership function by means of the sigmoid functions illustrated in FIG. 4.
Figure 6:
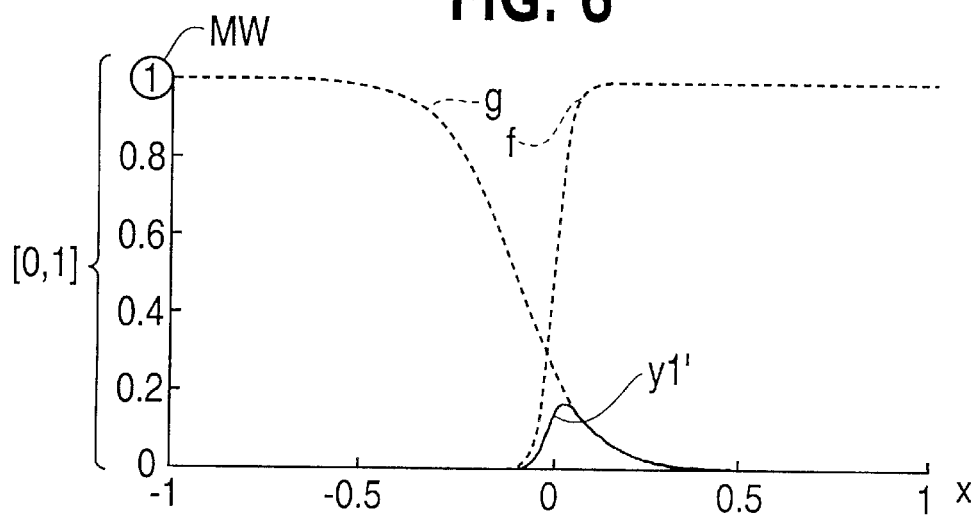
FIG. 6 shows, by way of example, a simulated membership function following the optimization of the neural network.
Figure 7:
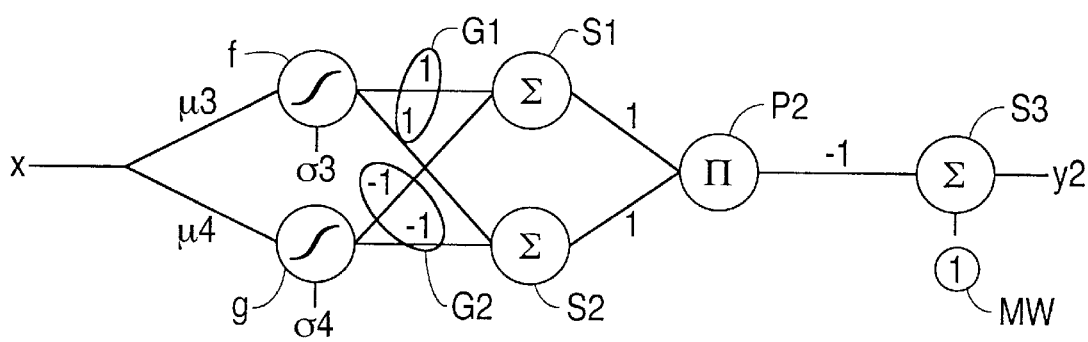
FIG. 7 shows the exemplary neurons of the method according to the present invention.
Figure 8:
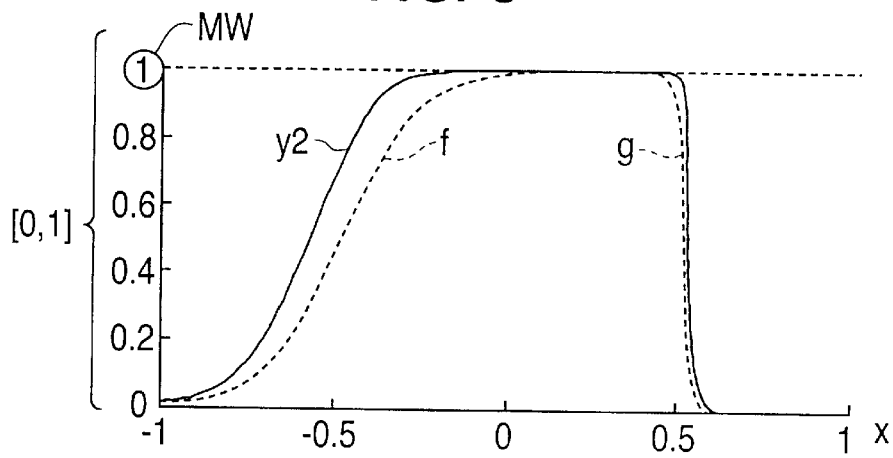
FIG. 8 shows, by way of example, the profile of a trapezoidal membership function transformed in accordance with the invention by means of the circuit diagram specified in FIG. 7.

The flow chart of FIG. 7 shows, by way of example, an embodiment of the method according to the present invention. According to the present invention, two sigmoid functions f and g are each linked together additively both via a first neuron S1 and via a second neuron S2.

In order to form the square function $[f(x,\mu 3,3)-g(x,\mu 4,4)]2$, the output signals from the first and second neurons S1 and S2 are advantageously linked together multiplicatively via a third neuron P2 and then linked together additively with the maximum value MW via a fourth neuron S3.

The method according to the present invention can advantageously be implemented by means of an apparatus, such as, for example, a neuro-fuzzy system installed on a computer or in an electric circuit, the neurons of the neural network being composed, in particular, of so-called standard neuron types. In the practical implementation, the neurons can in particular be implemented as software or hardware components or a combination of software and hardware. In this case, product neurons and summing neurons, in particular, are used to link the sigmoid functions f and g together. In the example of FIG. 7, the first, second and fourth neurons S1, S2 and S3 are implemented as summing neurons, and the third neuron P2 is implemented as a product neuron.

As a rule, the sigmoid functions f and g each have at least one parameter $\mu 3$ or $\mu 4$ determining their slope, and a parameter 3 or 4 for displacing the point of inflection. In the example of FIG. 7, the parameters $\mu 3$ and $\mu 4$ relate to the slope of the sigmoid functions f and g and, in particular depending on weighting parameters G1 and G2 of the summing neurons S1 and S2, have different signs.

During the transformation by the method according to the present invention, the parameters $\mu 3$, $\mu 4$, 3 and 4 are in particular given a preset value. During the optimization operation of the neural network NN, the parameters $\mu 3$, $\mu 4$, 3 and 4 can be changed by the transformation of the method according to the present invention which is carried out, but only such that subsequent back-transformation from the neural network NN into a fuzzy logic system is made possible.

Figure 9:
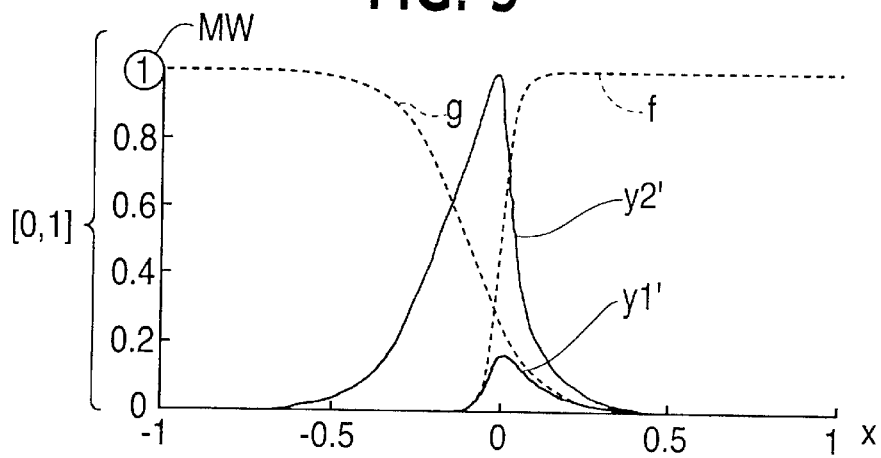
FIG. 9 shows, by way of example, the profile of two optimized membership functions following the optimization of the neural network, one membership function being based on a transformation according to the method of the present invention.

FIG. 9 reveals, by way of example, a possible, advantageous profile of a result function y2', which results from the application of the method according to the present invention. In this case, the result function y2' has all the features 1. to 3. already listed further above, which are necessary in order to permit back-transformation of the neural network NN into a fuzzy logic system.

By contrast, a result function y1' of a conventional transformation method is additionally illustrated in FIG. 9 for comparison. Because of mutual displacement of the linked sigmoid functions, which is brought about by the optimization of the neural network, the result function y1' does not reach the maximum value MW. As a result, in the conventional method back-transformation of the optimized neural network NN into a fuzzy logic system is not possible.

What is claimed is:

1. A method of transforming a fuzzy logic system used for simulating a technical process into an output simulated neural network, comprising:

linking sigmoid functions, including:
forming a first difference from the sigmoid functions;
squaring the first difference; and
normalizing the square of the first difference to a value range of the fuzzy logic system, the range having a maximum value, and forming a second difference from the maximum value and the square of the first difference; and outputting a simulated neural network as one of triangular and trapezoidal membership functions of the fuzzy logic system as a function of the normalized square of the first difference, such that back transforming of an optimization of the simulated neural network results in an optimized fuzzy logic system.

2. The method according to claim 1, wherein the linking of the sigmoid functions includes linking the sigmoid functions using a neural fuzzification network.

3. The method according to claim 1, wherein the maximum value is 1.

4. The method according to claim 1, wherein the linking of the sigmoid functions further comprises:

additively linking the sigmoid functions via first neuron;
additively linking the sigmoid functions via second neuron;
multiplicatively linking outputs from the first neuron and the second neuron via a third neuron; and
additively linking the third neuron together with the maximum value via a fourth neuron.

5. The method according to claim 1, wherein each respective one of the sigmoid functions has at least one parameter determining a slope of the respective one of the sigmoid functions.

6. The method according to claim 5, wherein each at least one parameter has a different sign than others of the at least one parameter.

7. A device to transform a fuzzy logic system used to simulate a technical process into an output simulated neural network, comprising:

a first neuron to link sigmoid functions together additively;
a second neuron to link the sigmoid functions together additively;
a third neuron to link outputs of the first neuron and the second neuron multiplicatively;
a fourth neuron to link an output of the third neuron with a maximum value additively, the fourth neuron outputting a simulated neural network as membership function signals, the membership functions including one of triangular and trapezoidal membership functions of the fuzzy logic system, such that back transforming of an optimization of the simulated neural network results in an optimized fuzzy logic system.

* * * * *